(12) United States Patent
Zimmermann (10) Patent No.: US 10,894,293 B2
(45) Date of Patent: Jan. 19, 2021

(54) HOB PEELING METHOD AND CUTTING TOOL FOR PRODUCING AT LEAST PARTIALLY ROUNDED TOOTH TIPS

(71) Applicant: Profilator GmbH & Co. KG, Wuppertal (DE)

(72) Inventor: Jonathan Zimmermann, Essen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 361 days.

(21) Appl. No.: 15/536,021

(22) PCT Filed: Dec. 3, 2015

(86) PCT No.: PCT/EP2015/078465
§ 371 (c)(1),
(2) Date: Oct. 23, 2017

(87) PCT Pub. No.: WO2016/096451
PCT Pub. Date: Jun. 23, 2016

(65) Prior Publication Data
US 2018/0036813 A1 Feb. 8, 2018

(30) Foreign Application Priority Data

Dec. 16, 2014 (DE) .................. 10 2014 118 764
Apr. 24, 2015 (DE) .................. 10 2015 106 354

(51) Int. Cl.
*B23F 5/16* (2006.01)
*B23F 21/10* (2006.01)
*B23F 17/00* (2006.01)

(52) U.S. Cl.
CPC ............ *B23F 5/163* (2013.01); *B23F 17/005* (2013.01); *B23F 21/10* (2013.01);
(Continued)

(58) Field of Classification Search
CPC .......... B23F 5/16; B23F 5/163; B23F 17/005; B23F 21/10; Y10T 407/1735;
(Continued)

(56) References Cited

U.S. PATENT DOCUMENTS 1,809,869 A * 6/1931 Simmons ................ B23F 21/10
407/28
1,892,091 A * 12/1932 Wildhaber .............. B23F 21/10
407/28
(Continued)

FOREIGN PATENT DOCUMENTS

DE 4122460 C1 4/1992
DE 10113653 A1 9/2002
(Continued)

OTHER PUBLICATIONS

German International Search Report Application No. PCT/EP2015/078465 completed: Mar. 11, 2016; dated Mar. 23, 2016 4 Pages.
(Continued)

*Primary Examiner* — Erica E Cadugan
*Assistant Examiner* — Michael Vitale
(74) *Attorney, Agent, or Firm* — Whitmyer IP Group LLC (57) ABSTRACT

A method for providing teeth on working gears by cutting, wherein the working gear and the cutting tool are driven in rotation at a predetermined speed ratio along axes oriented at an intersection angle. The flanks of the cutting teeth form edges having flank cutting sections arranged on the edges of a gap between two adjacent teeth and extend along a first contour line, and which as a result of an advance in the direction of the working gear engage in a cutting manner to produce teeth having a flank contour predetermined by the shape of the cutting edge. Each of the flank cutting sections is adjoined by a tip cutting section which extends along a second contour line in the region of the base of the cutting (Continued)

tooth gap, wherein the second contour line is curved such that at least partially rounded tooth tips are produced on the teeth.

5 Claims, 11 Drawing Sheets

(52) U.S. Cl.
CPC .. *Y10T 407/1745* (2015.01); *Y10T 409/10795* (2015.01); *Y10T 409/107791* (2015.01)

(58) Field of Classification Search
CPC .......... Y10T 407/174; Y10T 407/1745; Y10T 409/101431; Y10T 409/103816; Y10T 409/103975; Y10T 409/10477; Y10T 409/105088; Y10T 409/105247; Y10T 409/105565; Y10T 409/105724; Y10T 409/107632; Y10T 409/107791; Y10T 409/10795; Y10T 409/108109; Y10T 409/108268
USPC ........ 407/27, 28, 29; 409/10, 25, 26, 31, 33, 409/34, 36, 37, 49, 50, 51, 52, 53
See application file for complete search history.

(56) References Cited

U.S. PATENT DOCUMENTS

| | | | |
|---|---|---|---|
| 2,258,849 A | 10/1941 | Erhardt | |
| 2,324,003 A | 7/1943 | Kitchen et al. | |
| 2,427,641 A | 9/1947 | Wildhaber | |
| 9,527,148 B2 * | 12/2016 | Vogel | B23F 5/163 |
| 2011/0268523 A1 * | 11/2011 | Heinemann | B23F 5/163 409/12 |
| 2014/0090503 A1 * | 4/2014 | Ohmi | B23F 17/005 74/434 |

FOREIGN PATENT DOCUMENTS

| | | | | |
|---|---|---|---|---|
| DE | 102005049530 B4 | | 1/2007 | |
| DE | 102005049528 A1 | | 5/2007 | |
| DE | 102008037514 A1 | | 5/2010 | |
| DE | 102008037578 A1 | | 5/2010 | |
| DE | 102009003601 A1 | | 9/2010 | |
| GB | 220192 A | * | 8/1924 | ............ B23F 7/00 |
| GB | 655266 A | * | 7/1951 | ............ B23F 21/10 |
| JP | 05092319 A | * | 4/1993 | ............ B23F 21/10 |
| JP | 2014039971 A | | 3/2014 | |

OTHER PUBLICATIONS

German Written Opinion of the International Searching Authority Application No. PCT/EP2015/078465 dated Jun. 23, 2016 7 Pages.
English Translation of German International Search Report Application No. PCT/EP2015/078465 Completed: Mar. 11, 2016; dated Mar. 23, 2016 3 Pages.

* cited by examiner

HOB PEELING METHOD AND CUTTING TOOL FOR PRODUCING AT LEAST PARTIALLY ROUNDED TOOTH TIPS

TECHNICAL FIELD

The invention relates to a method for providing teeth on working gears by means of a cutting tool having cutting teeth, wherein the working gear is driven in rotation by a workpiece spindle about a workpiece spindle axis and the cutting tool is driven in rotation by a tool spindle about a tool spindle axis at a predetermined speed ratio to one another, the workpiece spindle axis and the tool spindle axis are oriented at an axis intersection angle to one another, and wherein the tooth flanks of the cutting teeth form, on the front ends thereof, cutting edges having flank cutting sections, which are arranged on the edges of a gap between two adjacent cutting teeth and in each case extend along a first contour line, and which, as a result of an advance in the direction of the toothing of the working gear, engage in the working gear in a cutting manner to produce teeth having a tooth flank contour predetermined by the shape of the cutting edge. The invention furthermore relates to a cutting tool for carrying gout the method by means of cutting teeth, wherein the cutting tool has a tool axis, wherein the tooth flanks of the cutting teeth form, on the front ends thereof, cutting edges having flank cutting sections, which are arranged on the edges of a gap between two adjacent cutting teeth and in each case extend along a first contour line.

BACKGROUND

A generic method or a generic hob peeling tool, respectively, is described in DE 10 2009 003 601 A1, but also in DE 10 2008 037 514 A1, DE 10 2008 037 578 A1 and DE 10 2005 049 528 A1. A tool spindle axis, which defines a tool spindle axis with its axis of rotation, supports a cutting tool, which rotates about its contour axis. A workpiece spindle axis, which defines a workpiece spindle axis with this axis of rotation, supports a working gear, which is to be provided with teeth. The two axes are oriented at an axis intersection angle to one another, so that the cutting teeth of the cutting tool engage in a peeling manner in the material of the working gear in response to a synchronized rotation of the two spindles. As a result of an advance in the direction of the toothing of the working gear, the working gear is provided with teeth as a result of an engagement of the cutting flanks in the workpiece in a peeling manner. The teeth of the working gear can run parallel to the axis of the working gear, but also crosswise and/or at an incline thereto. The production of spur-toothed and helically-toothed working gears is possible. The cutting teeth of the cutting tool run obliquely to the axis of the cutting tool in such a way that the cutting teeth engage in the gaps between the teeth of the working gear in a meshing manner or that the teeth of the working gear engage in the cutting teeth gaps in a meshing manner, respectively. On their front ends, the tooth flanks of the cutting teeth have cutting edges. The cutting edges form flank cutting sections, which bring the flanks of the working gears into a predetermined form, for example involute form. The flank cutting sections are arranged on the edges of the cutting tooth gap and in each case run along a contour line, which is an arc. The curvature of the arc is chosen in such a way that the tooth flanks of the teeth to be produced obtain the predetermined shape, in particular involute shape. In the prior art, the front faces of the cutting teeth in each case run in a plane, which runs substantially perpendicular to the two tooth flanks of the cutting wheel. The cutting tools, which are also identified as cutting wheels, thus have a step cut. In the area of the base of the cutting teeth gap, a graded distance thus forms between the flank cutting sections.

In addition, a tool for providing teeth for producing a herringbone gear, belongs to the prior art. Herringbone teeth are made by means of a planing machine, which uses a planing wheel having obliquely running planing teeth, as tool. The front faces of the planing teeth are provided with so-called front sharpening. In the case of a front sharpening, the tooth flank, which runs at an acute angle to the front face of the planing tooth, is formed by the edge of a chamfer. The cutting edge, which runs at an obtuse angle to the front face of the planing tooth, is formed by the edge of a groove.

The invention furthermore relates to the use of such a tool for providing teeth on working gears.

SUMMARY

The invention is based on the object of further developing a generic hob peeling method, a corresponding device, and a tool, which can be used for the method, in a manner, which is advantageous for use.

The object is solved by the use of a newly designed cutting tool in the form of a hob peeling gear. Initially and substantially, provision is made for the tooth edge, which is assigned to a tooth flank running at an acute angle to the front face of the cutting tooth, is formed by the edge of a chamfer. The cutting edge, which is assigned to a tooth flank running at an obtuse angle to the front face of the cutting wheel, is formed by the edge of a groove. In spite of an inclination of the tooth flank, the cutting edges can nonetheless have the same or a similar rake angle. The front faces of all cutting teeth are preferably located in a rotationally symmetrical surface, which runs continuously around the tool spindle axis. This surface can be a plane, in which the tool spindle axis is oriented vertically. However, the plane can also be formed by a cone jacket surface, in particular inner cone jacket surface, whereby the tool spindle axis or the contour axis of the cutting tool, respectively, is located in the cone axis. The generic method can be further developed in a variety of ways by means of such an embodiment of a peeling wheel, wherein it is at least advantageous, but preferably essential that the cutting edges, which define a tooth gap between two adjacent cutting teeth, thus the two flank cutting sections and the adjoining tip cutting sections, are preferably located in a common interruption-free surface, in particular plane or cone jacket surface. Tooth flanks, which run at an acute angle to the front face and which run at an obtuse angle to the front face are thus formed. In the case of such a novel embodiment, the cutting edges, which extend between two adjacent teeth, can run in a plurality of planes, which are located slightly offset to one another. In the case of such an embodiment, provision is preferably made for the tooth flanks, which run at an acute angle to the front face, to have a chamfer on their edge adjoining the front face. An edge of the chamfer can at least form the flank cutting section. The tooth flanks, which run at an obtuse angle to the front face of the cutting wheel, then have a flank cutting section, which is formed by the edge of a groove, on their edge adjoining the front face. The chamfer and the groove are ground into smooth front faces of the tool. The maximum offset of the cutting edges is preferably the depth of the groove or of the chamfer or the difference of the depth of the groove from the depth of the chamfer, respectively.

A first alternative proposes for each of the two flank cutting sections to in each case be adjoined by a tip cutting section, which extends along a second contour line in the area of the base of the cutting tooth gap. The contour line runs on a foot corner curvature, in particular along a foot corner radius. The flank cutting sections and the tip cutting sections in each case preferably extend along arcs, wherein the flank cutting section and the adjoining tip cutting section run on oppositely curved arcs. The flank cutting section and the tip cutting section thus adjoin one another at a curvature inflection point of the cutting edge. An at least partially rounded tooth tip of the working gear can by produced by means of the tip cutting section. An edge of the chamfer or groove, respectively, cannot only form the flank cutting section. In some areas, however, the edge can also form one of the tip cutting sections. The tip cutting section adjoining the flank cutting section can thus be formed by the edge of a groove or a chamfer in some areas. The chamfer is sharpened on the acute-angled tooth flank. The groove is ground into the edge of the front face of the tooth adjoining the obtuse-angled tooth flank. The flank cutting sections preferably transition into the tip cutting sections in a kink-free manner. The flank cutting sections, however, can also transition into the tip cutting sections by forming a slight discontinuity. Such a discontinuity forms a chip-breaking contour. This is in particular advantageous, when the entire circumferential line of the cutting tool forms a substantially continuous cutting edge. The formation of long chip curls is avoided by means of this chip-breaking discontinuity. The two tip cutting sections can be connected to one another in an apex region of the cutting tooth gap with an apex cutting section. The apex region of a tooth of the working gear is profiled by means of this apex cutting section. The two tip cutting sections and the apex cutting section located therebetween can transition into one another smoothly, thus substantially free from kinks so as to be rounded in the same direction. Particularly preferably, the tip cutting sections, together with the flank cutting sections and the apex cutting section, form a common U-shaped cutting edge, which is substantially located in a plane, which runs parallel to the front face of the cutting tool. The U-shaped cutting edge, however, can also be located in a cone surface. All U-shaped cutting edges are preferably located substantially in a common surface/plane, wherein a slight plane offset of maximally the depth of the groove or of the chamfer, respectively, is permissible. Not only the tooth flanks of the teeth of the working gear can be brought into a predetermined flank contour by means of the tool according to the invention. According to the invention, a partial rounding or full rounding, respectively, of the tooth tips of the teeth of the working gear is possible. According to the invention, a partial rounding or complete rounding, respectively, of the teeth of the working gear is possible. The method carried out by means of the cutting tool can be a finishing of a pre-toothed blank, wherein the tooth flanks are brought into the desired contour in response to the finishing. In response to the finishing, the tooth tips are in particular rounded or partially rounded by means of the tip cutting sections of the cutting edges. However, an untoothed blank can also be provided with teeth completely by means of the tool according to the invention. In response to this processing, the tooth gap produced by means of the cutting tool between the teeth of the toothing to be created is deepened gradually, wherein the tooth tip rounding or the partial rounding, respectively, is carried out in the last processing step. The workpiece axis and the tool axis run parallel to one another in a projection plane, in which the axis of the rotation of the workpiece spindle is located and which runs through the point of the lowest tooth engagement of the cutting tooth in the workpiece. The tool axis is inclined about the axis intersection angle at right angles to this projection surface with respect to the workpiece axis. In the case of a cutting tool, which is used in this arrangement, the apex lines of the cutting teeth, which extend in the direction of extension of the cutting teeth, run on a cone jacket surface. The apex lines of the cutting teeth can run on a cone jacket surface. The cone jacket surface thus forms an enveloping surface, within which the cutting teeth run. Such a tool has the advantage that the device can be set up more easily, because only the axis intersection angle needs to be adjusted.

In a second alternative of the invention, the use of a cutting tool is provided, in the case of which the apex lines of the cutting teeth run on a cylinder jacket surface. Such a spur-toothed or helically-toothed cutting tool can be produced more easily. When carrying out the method, the axis of rotation of the workpiece and the axis of rotation of the tool do not run parallel to one another in the projection plane, but have an angle of inclination, so that the apex line runs at a clearance angle to the apex line of the produced tooth foot in response to the processing. The front face of the cutting tool forms flank cutting sections, which has the above-mentioned groove or chamfer, respectively. The front face of the cutting tool can be a plane. The front face, however, is preferably formed by an inner cone surface, so that a positive rake angle forms in response to the hob peeling. Even though in the case of this tool, the cutting teeth are located inside an enveloping surface, which is a cylinder jacket surface. Compared to the above-described alternative, in the case of which the apex lines run on a cone jacket surface, this cutting tool has the advantage that it can be produced more easily, the effort for setting up the device is slightly higher, because the tool spindle needs to additionally be inclined at an angle away from the toothing to be created, in order to create a clearance angle.

In a third alternative of the invention, provision is made for the cutting teeth of the cutting tool not to have a uniform tooth width. Provision is made for at least one cutting tooth to be widened. The size of the widening can extend across any desired circumferential length. As a result of the further development according to the invention of the prior art, the large steps are not formed between the cutting flanks of a widened cutting tooth in the case of the prior art, where a step cut is used. The widened tooth can extend across two or more division periods of the cutting tool. Provision is in particular made for the width of the widened tooth to correspond to the width of two cutting teeth located next to one another. The at least one widened cutting tooth preferably extends across a tooth gap of the regular division. The widened cutting tooth is fitted into the periodicity of the regular division. A widened tooth gap can extend next to a widened cutting tooth. The widened cutting tooth, however, can also be arranged next to a narrowed tooth gap. It can be flanked by a narrowed or a widened tooth gap on both sides. The speed ratio of tool spindle and workpiece spindle is chosen in such a way that the widened cutting tooth dips into a widened tooth gap of the working gear after a workpiece rotation. The speed of the tool spindle can be an integral multiple of the workpiece spindle.

BRIEF DESCRIPTION OF THE DRAWINGS

Exemplary embodiments of the invention will be discussed below by means of enclosed drawings.

DETAILED DESCRIPTION

The method according to the invention is carried out by means of a machine tool known in the prior art. This machine tool is not illustrated in the drawings, because it is described in a variety of forms in other publications. Reference is made only in an exemplary manner to a device, as it is described in DE 4 122 460 C1, DE 101 13 653 A1 or DE 10 2005 049 530 B4.

A tool spindle, which driven in rotation about a tool spindle axis 5, supports a cutting tool 2, which has cutting teeth 3, which protrude radially to the outside. The apex lines of the cutting teeth 3 run obliquely to the tool spindle axis 5, which coincides with the contour axis of the cutting tool 2. Cutting teeth gaps 20 are located between the cutting teeth 3. The front face 7 of the cutting tool 2 is located in a plane, which runs perpendicular to the tool axis 5 or of the tool axis 5, respectively. On its edge adjoining the front face 7, a tooth flank 6, which runs at an acute angle to the front face 7, has a flank cutting section 12. On its edge adjoining the front face 7, a tooth flank 6', which is located opposite this tooth flank 6 and which runs at an obtuse angle to the front face 7, has a flank cutting section 8 (see FIGS. 8, 10).

Figure 7:
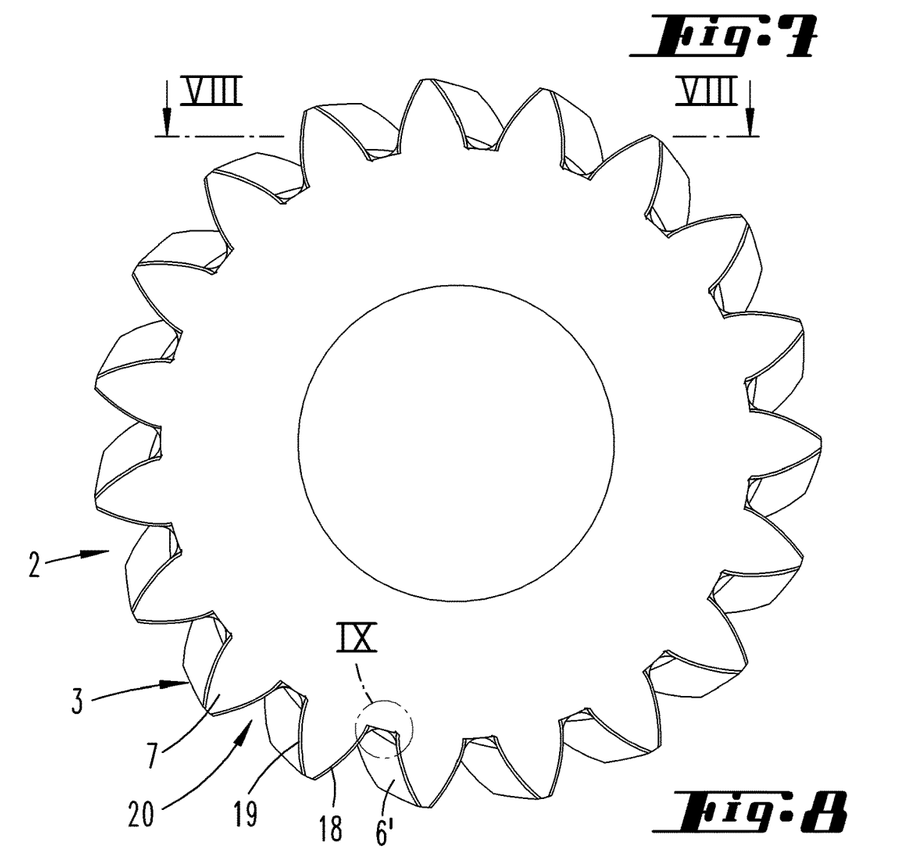
FIG. 7 shows a front face view of the cutting tool 2.
Figure 8:
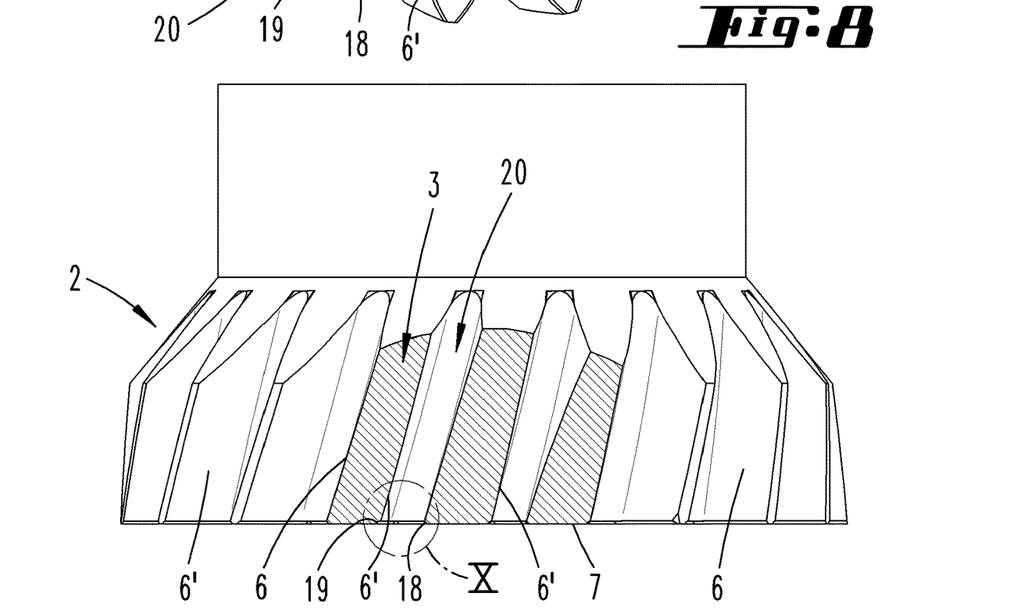
FIG. 8 shows the section according to line VIII-VIII in FIG. 7.
Figure 9:
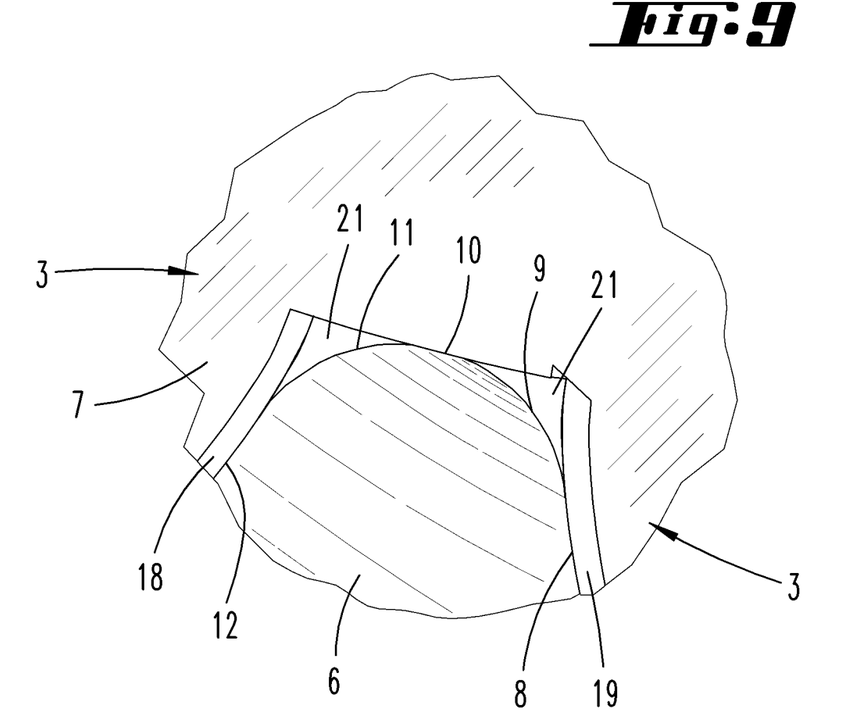
FIG. 9 shows the section IX in FIG. 7, greatly enlarged.
Figure 10:
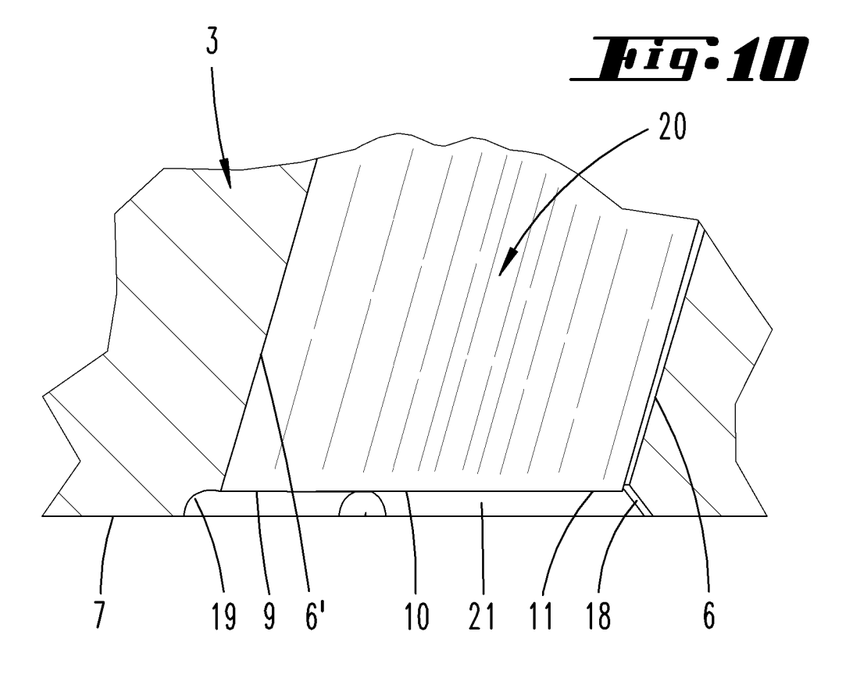
FIG. 10 shows the section X in FIG. 8, greatly enlarged.

The two flank cutting sections 8, 12 run on a line, which is curved in the plane of the front face 7 and which is curved in such a way that the tooth flanks 14 of teeth 13 of a working gear 1 obtain a predetermined involute form by means of these flank cutting sections 8 (see FIGS. 7, 9).

Figure 2:
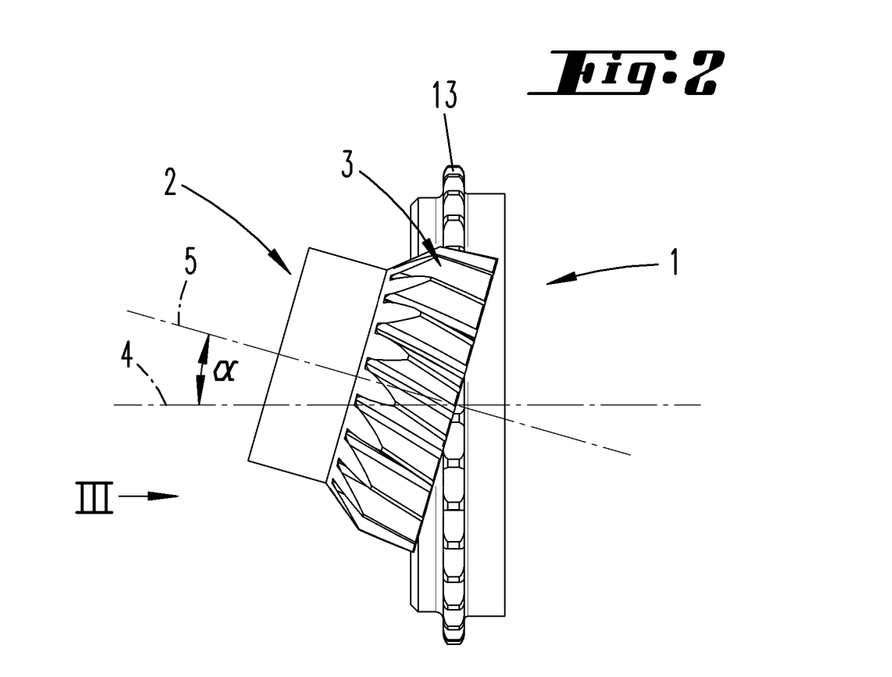
FIG. 2 shows a further side view in viewing direction of the arrow II in FIG. 1 to clarify the axis intersection angle α.
Figure 3:
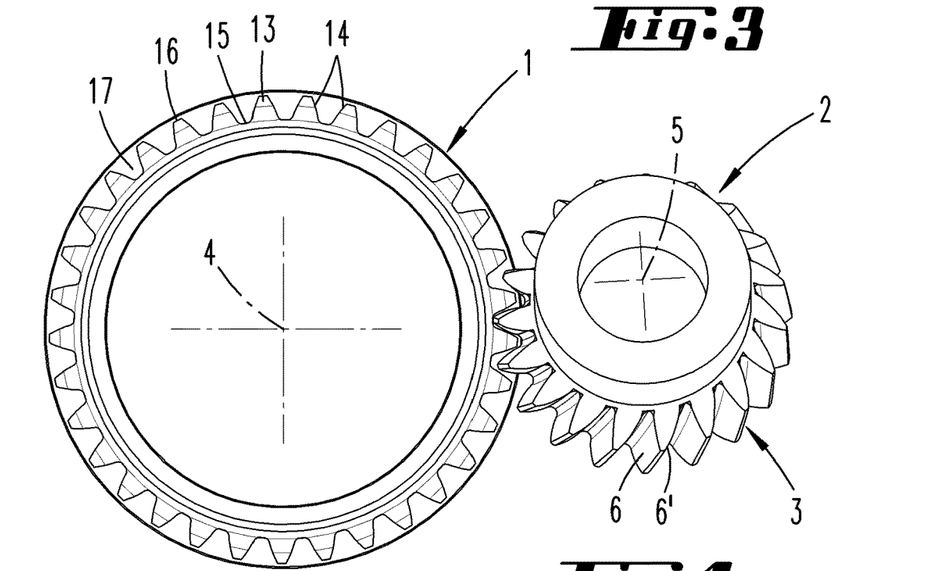
FIG. 3 shows a top view onto the arrangement illustrated in FIGS. 1 and 2.
Figure 4:
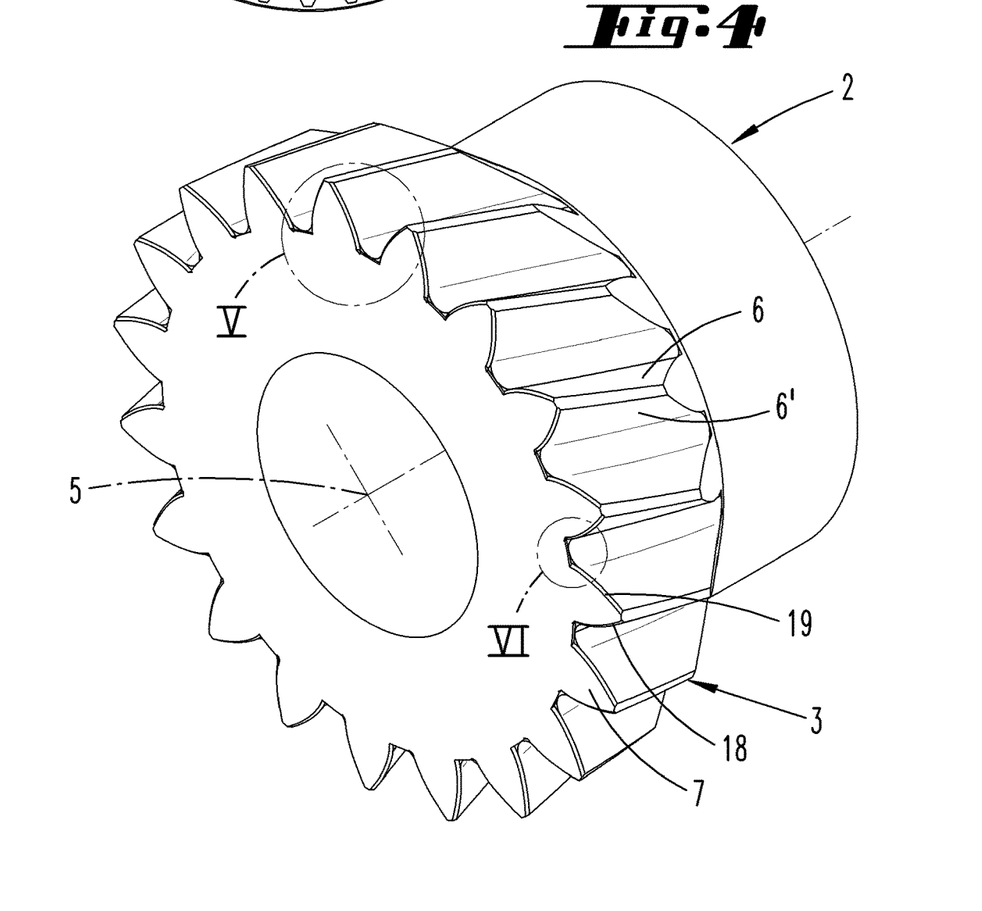
FIG. 4 shows a perspective illustration of the cutting tool 2 with a view onto the front face 7.

The working gear 1 has an axis 4 and is driven in rotation by a non-illustrated workpiece spindle, which defines a workpiece spindle axis 4. The workpiece spindle axis 4 and the tool spindle axis 5 are oriented at a fixed axis intersection angle α to one another (see FIG. 2). As a result, the cutting tool 2, which is driven in rotation synchronously to the working gear 1, engages with its cutting teeth 3 in the working gear 1 in a peeling manner (see FIG. 3). By means of an advance, which is directed in the direction of extension of the teeth 13 of the working gear 1, the tooth gaps 17 are peeled out from between the teeth 13. Said tooth flanks 14, which run on an involute, are formed. The advance can also be directed in opposite direction of the peeling direction. The processing of the working gear 1 then takes place in a pulling step.

Figure 5:
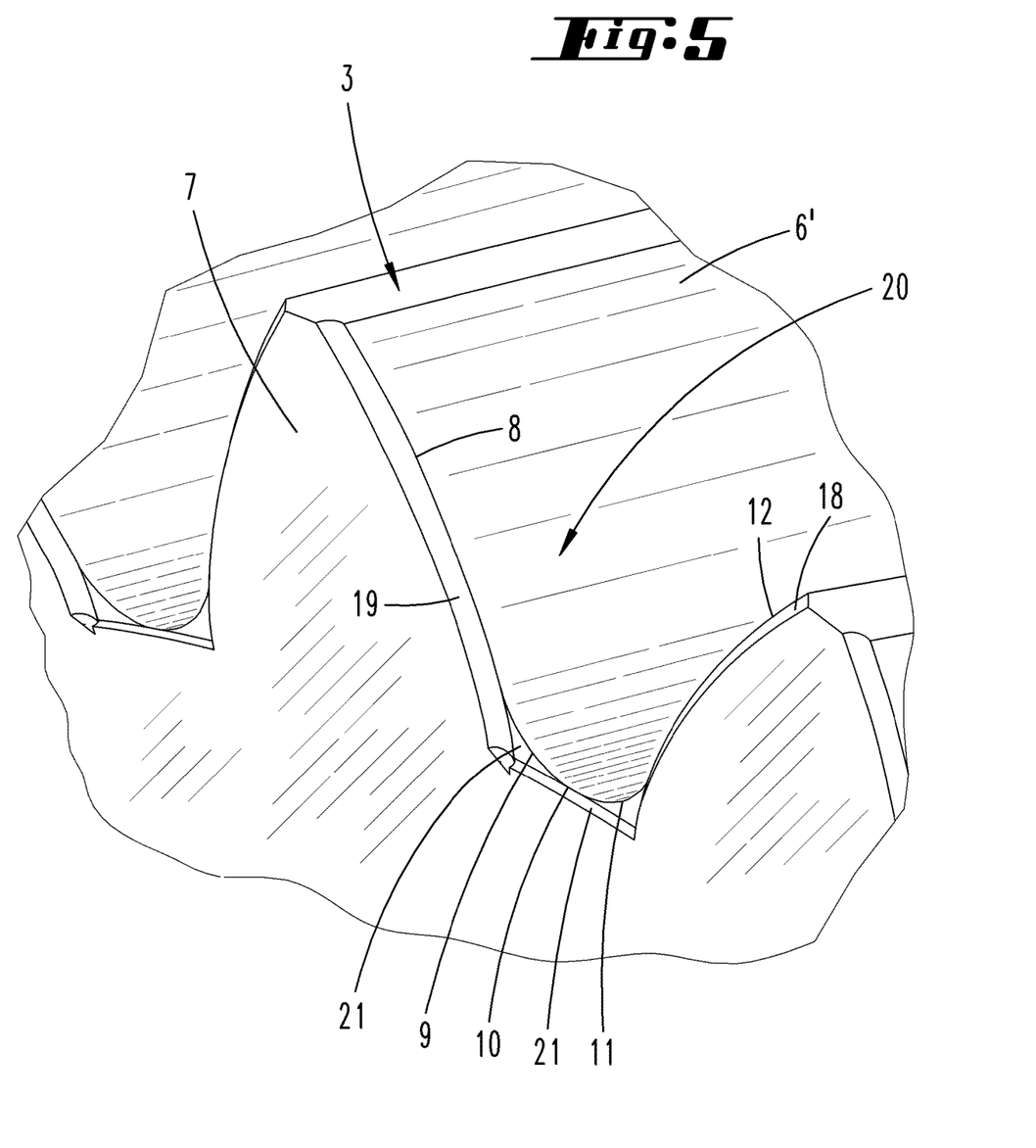
FIG. 5 shows the section V in FIG. 4, greatly enlarged.
Figure 6:
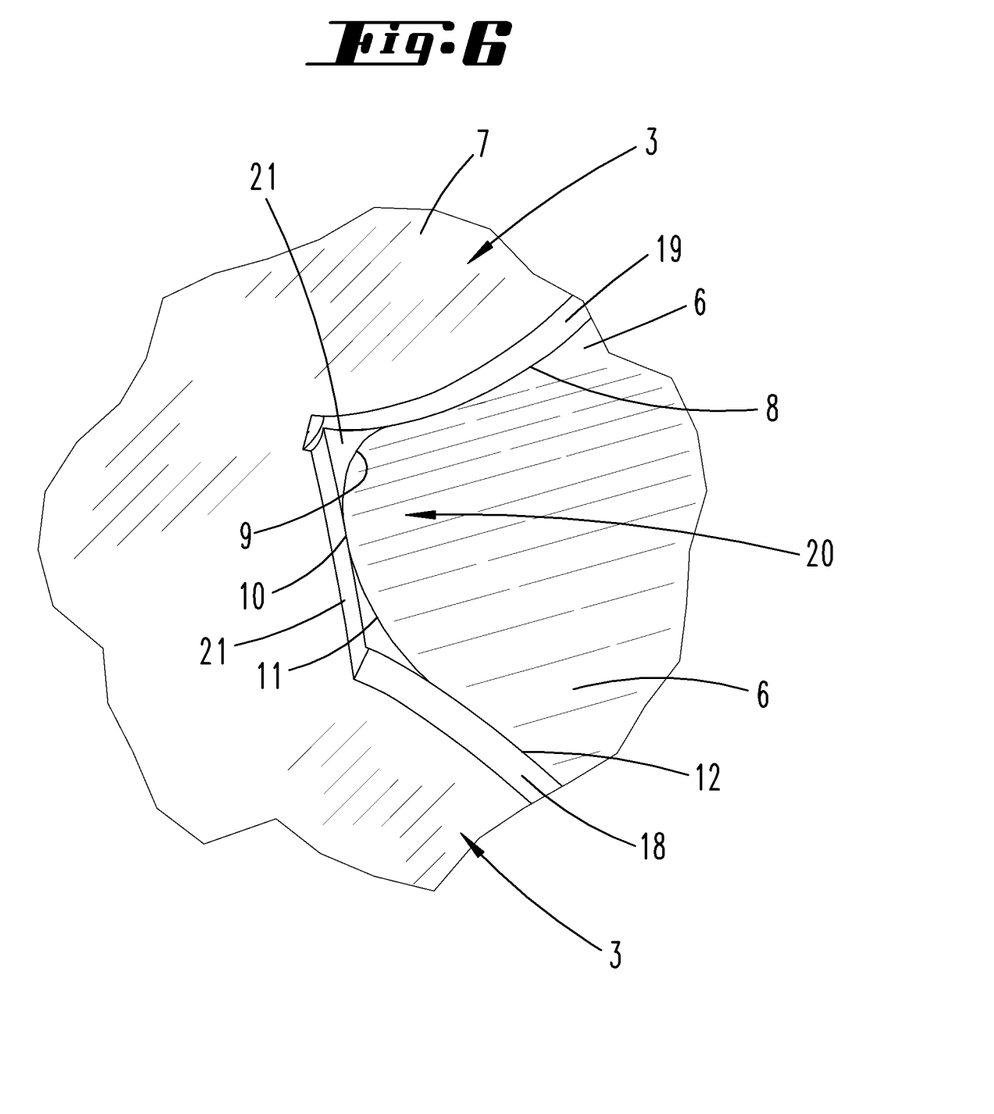
FIG. 6 shows the section VI in FIG. 6, greatly enlarged.

In the case of the cutting tool 2, a tip cutting section 9 follows the flank section 8 and a tip cutting section 11 follows the flank cutting section 12 (see FIGS. 5, 6, 9). The two tip cutting sections 9, 11 run on an arc-shaped line, wherein the arc, on which the tip cutting section 9, 11 runs, is oriented away from the arc, on which the flank cutting section 8, 12 runs. The two arcs are curved in opposite direction, but in the case of this exemplary embodiment are located in a common plane, which runs parallel to the front face 7, which, in turn, runs perpendicular to the tool spindle axis 5 or to the contour axis of the cutting tool 2, respectively.

The cutting edge formed by the flank sections 8, 12, the apex cutting section 10 and the tip cutting sections 9, 11, extends from the tip of a cutting tooth 3 to the tip of an adjacent cutting tooth 3 in an interruption-free and smooth manner through the entire cutting tooth gap 20. In the case of the exemplary embodiment, the individual sections 8 to 12 of the cutting edge transition into one another in a kink-free manner. While the tooth flanks 14 are profiled by means of the flank cutting sections 8, 12, the tooth tip 16 of the tooth 13 is profiled by means of the tip cutting sections 9, 11 and the apex cutting section 10. The tooth tip 16 thus obtains a rounding, which is defined by the shape of the tip cutting sections 9, 11 and the shape of the apex cutting section 10. This can be a continuous rounding. However, the tip can also be only partially rounded.

It can be gathered from the greatly enlarged illustrations of FIGS. 5, 6, 9 and 10 that a chamfer 18, which forms the flank cutting section 12 in the transition area to the tooth flank 6, forms the edge of the tooth flank 6 adjoining the front face 7 in an acute-angled manner. It can further be gathered from these figures that the tooth flank 6', which adjoins the front face 7 with its edge in an obtuse-angled manner, forms a flank cutting section 8, which is formed by the edge of a groove 19, which extends along the edge in the front face 7. The groove 19 and the chamfer 18 can be created by means of the same grinding tool, a specifically trimmed grinding wheel. They are ground into the front face of the tool. In spite of tooth flanks 6, 6', which run obliquely to the front face 7, flank cutting sections 8, 12 can be created, which have a defined cutting edge angle, by means of such a face sharpening.

By forming a beveling 21, the two tip cutting sections 9, 11 transition into the front face 7. The beveling 21 can be ground into the tool. This occurs in such a way that the tip cutting sections 9, 11 transition into one another in the area of the apex section 10 and transition with their other ends into the respective flank cutting section 8, 12. A plane is thus formed, in which all cutting edges of the cutting tool 2, which are in each case formed by cutting sections 8 to 12, are located, wherein this plane runs at a parallel offset to the plane of the front face 7.

Figure 11:
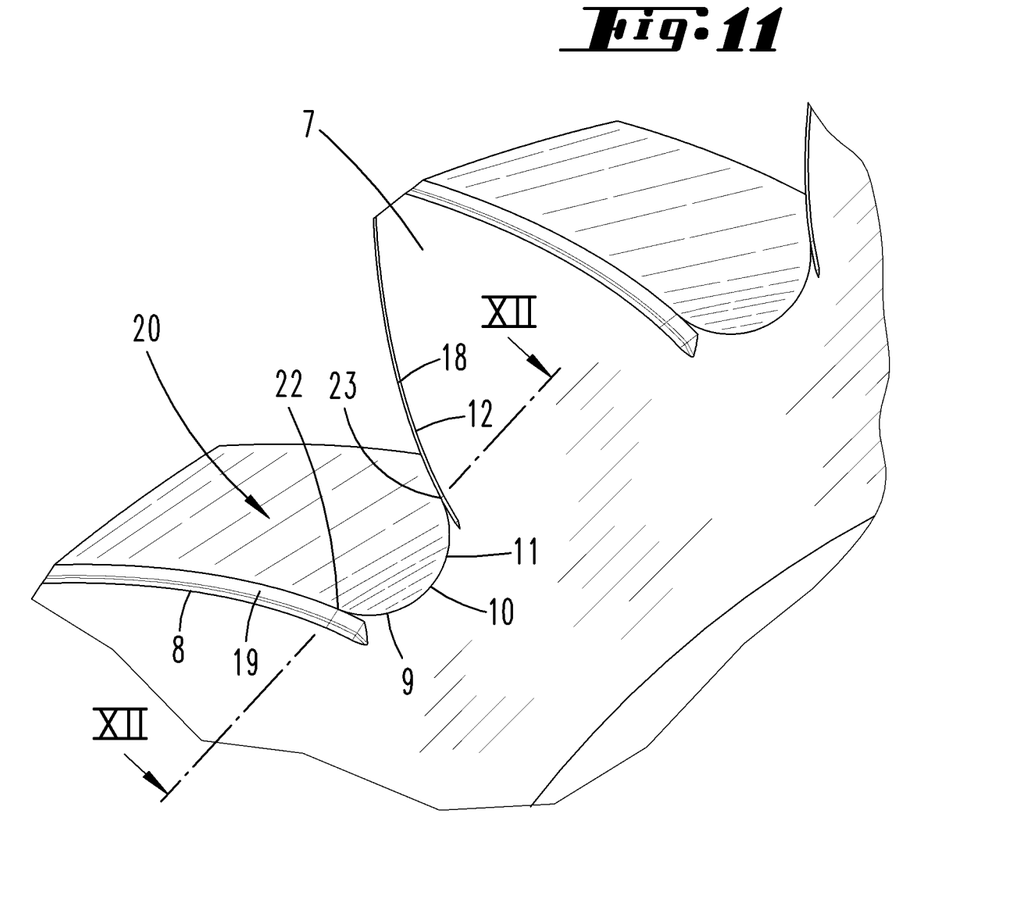
FIG. 11 shows a second exemplary embodiment of the invention, similar to the illustration according to FIG. 6.
Figure 12:
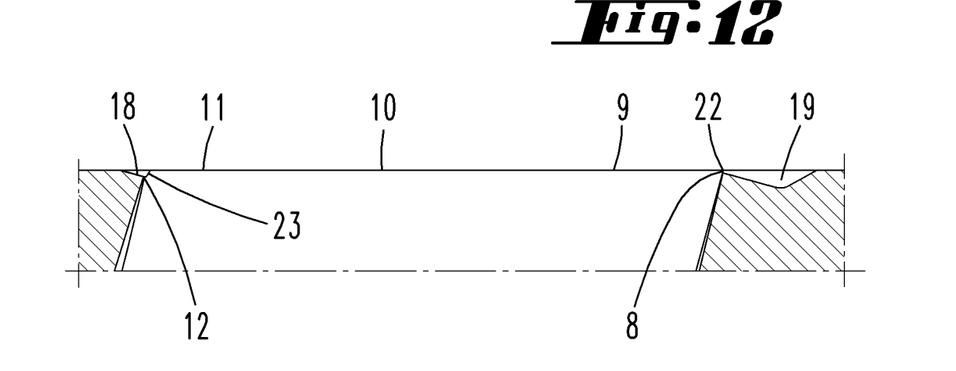
FIG. 12 shows the section according to line XII-XII in FIG. 11.
Figure 13:
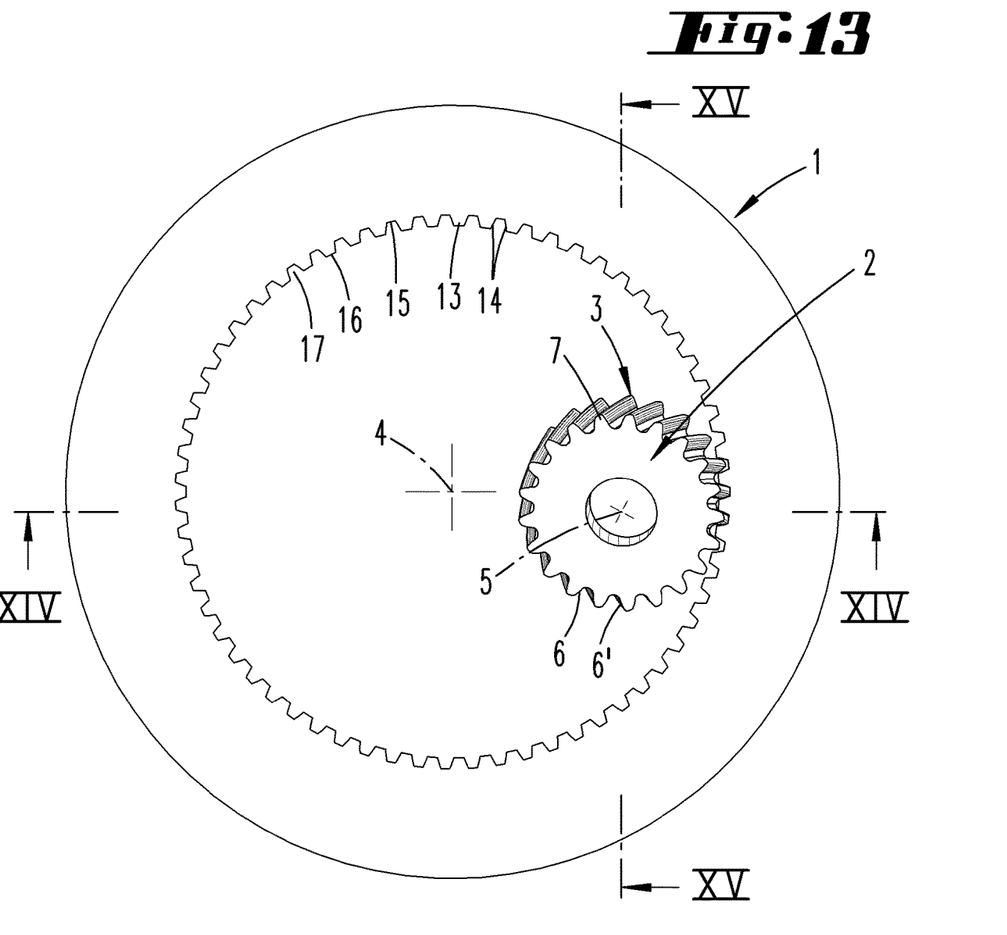
FIG. 13 shows a third exemplary embodiment of the invention in an illustration according to FIG. 3.

In the case of the second exemplary embodiment illustrated in FIG. 11, each cutting tooth 3 or each cutting tooth gap 20, respectively, has two flank cutting sections 8, 12. The flank cutting section 8 is formed by the edge of a groove 19, and the flank cutting section 12 is formed by the edge of a chamfer 18. The flank cutting sections 8, 12 are thus located so as to be offset by a small distance to the front face 7. This distance is maximally the depth of the groove 19 or of the depth of the chamfer 18, respectively.

There is no beveling 21 here. Here, the two tip cutting sections 9, 11 and the apex cutting section 10 located therebetween run in the plane of the front face 7. As a result, the flank cutting section 12 transitions into the tip cutting section 11 by forming a slight discontinuity 23, and the flank cutting section 8 transitions into the tip cutting section 9 by forming a slight discontinuity 22. These two discontinuities 22, 23 have the advantage that the chip breaks there in response to hob peeling. The desired short chips are created. It is avoided that chip curls form in the case of a circumferential, uninterrupted cutting edge.

The discontinuities 22, 23, however, are so small that they do not leave behind any or only very slight contours in the workpiece.

Figure 1:
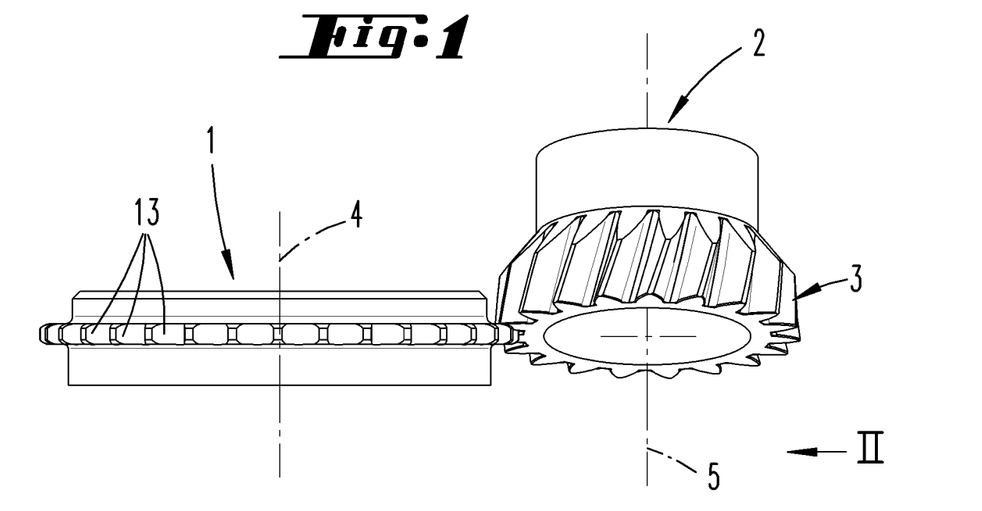
FIG. 1 shows a working gear 1 and a cutting wheel, the teeth of which engage in the working gear 1 in a chip removing manner and which is formed by a cutting tool 2.
Figure 14:
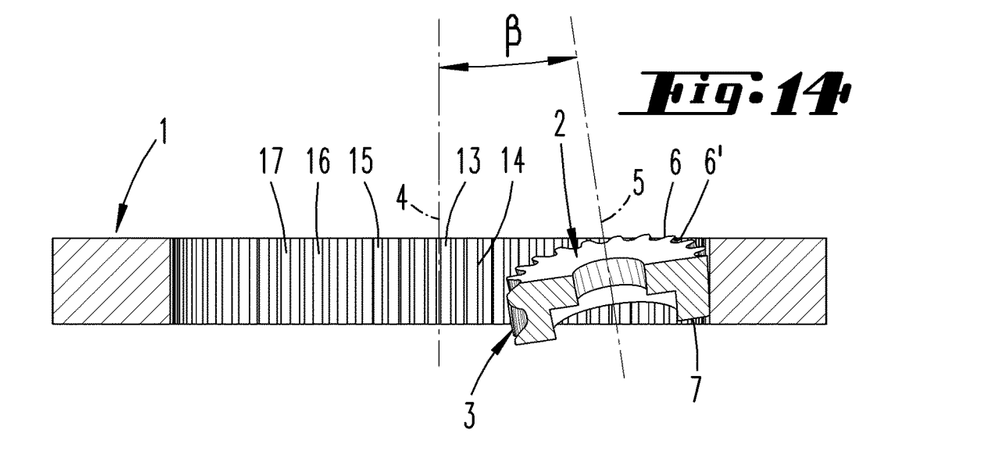
FIG. 14 shows the section according to line XIV-XIV in FIG. 13 through the workpiece spindle axis 4 and the point of the lowest engagement of a cutting tool in the tooth gap to be produced.

In the case of the third exemplary embodiment illustrated in FIGS. 13 to 19, a working gear 1, which is provided with teeth on the inside, is processed by means of a cutting tool 2, which is provided with teeth on the outside. FIG. 14 substantially corresponds to an illustration according to FIG. 1 of the first exemplary embodiment. While in the case of the first exemplary embodiment, the axis of rotation 4 of the working gear 1 and the axis of rotation 5 of the cutting wheel 2 run parallel to one another in a projection plane, in which the workpiece spindle axis 4 is located and which is placed through the lowest tooth engagement location of the cutting tooth, the tool spindle axis 2 has an inclination β with respect to the workpiece spindle axis 4 in the case of the exemplary embodiment illustrated in FIGS. 13 to 19. In the case of the exemplary embodiments illustrated in FIGS. 1 to 12, the apex lines of the cutting teeth 3 run on a truncated cone jacket surface. In the case of ht exemplary embodiment illustrated in FIGS. 13 to 19, the apex lines 3' of the cutting teeth 3 run on a cylinder jacket surface. Due to the angle of inclination β, a clearance angle of the apex line 3' of the tooth tips results across the extension length of the cutting teeth 3 as compared to the apex line of the tooth foot of the toothing, which is to be produced, in the working gear 1.

Figure 15:
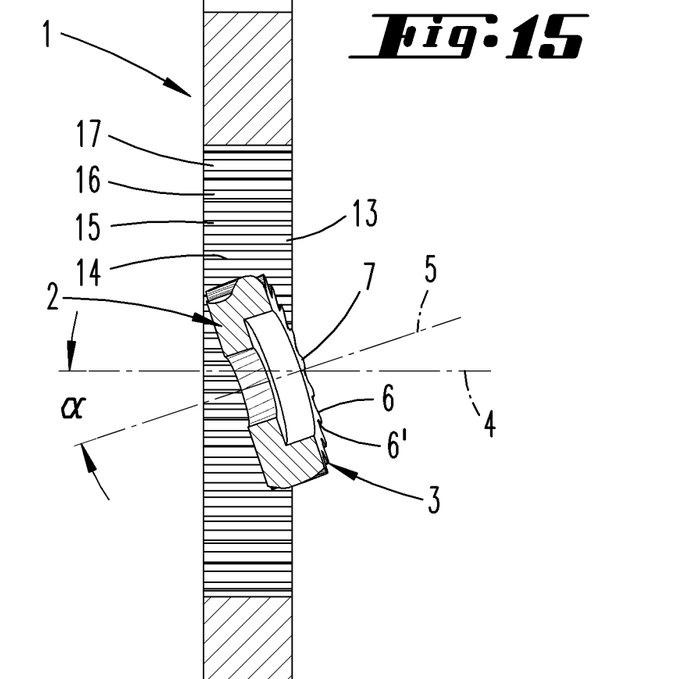
FIG. 15 shows the section according to tine XV-XV in a sectional plane, which runs perpendicular to the sectional plane of the section according to line XIV-XIV.
Figure 16:
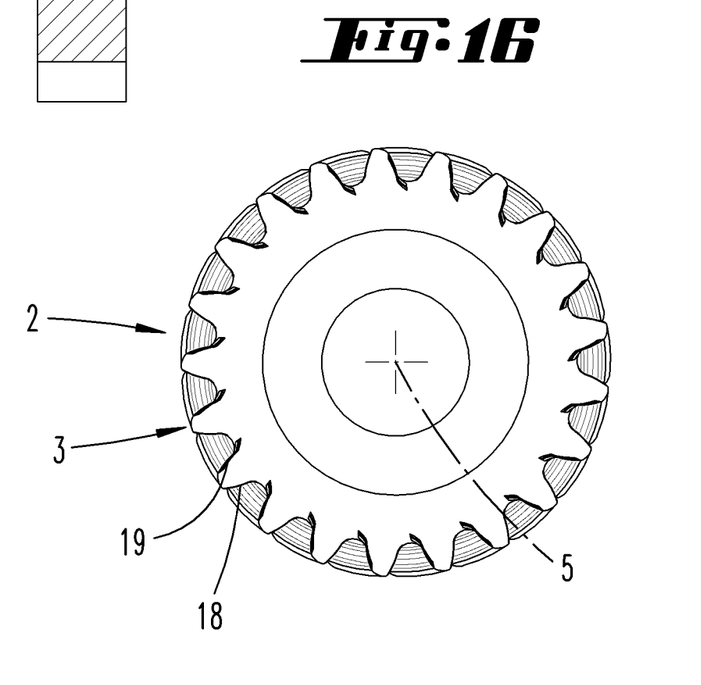
FIG. 16 shows the top view onto the front face having the cutting edges of the cutting wheel 2 illustrated in FIGS. 13 to 15.

FIG. 15 shows the axis intersection angle α. The axis intersection angle α, which is preferably approximately 20°, is measured in a plane, which extends perpendicular to the projection plane, in which the angle of inclination β is located, which is preferably 8°.

Here, the cutting edges of the cutting teeth 3 are also formed by chamfers 18 or grooves 19, respectively, and have a tip cutting section.

Figures 17, 18, 19, 20:
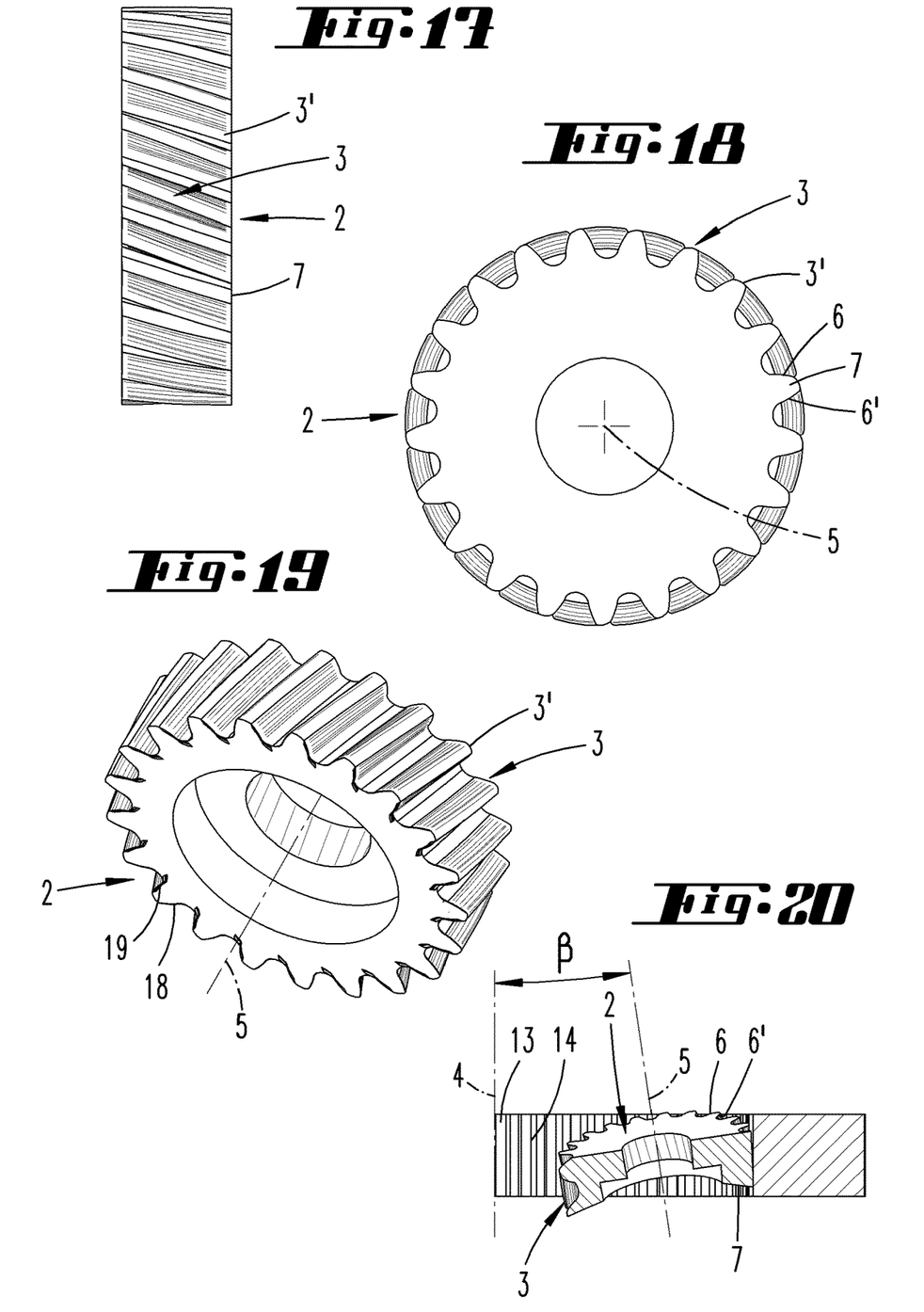
FIG. 17 shows a side view onto the cutting wheel illustrated in FIG. 16.
FIG. 18 shows a rear side view onto the cutting wheel illustrated in FIG. 16.
FIG. 19 shows the cutting wheel illustrated in FIGS. 16 to 18 in a perspective view.
FIG. 20 shows a fourth exemplary embodiment according to FIG. 14.

FIG. 20 shows a fourth exemplary embodiment in an illustration according to FIG. 14. In contrast to the third exemplary embodiment, the front face 7 is not located in a plane, but in an inner cone surface, so that the cutting wheel 2 creates a the toothing in the working gear 1 with a positive rake angle.

Figure 21:
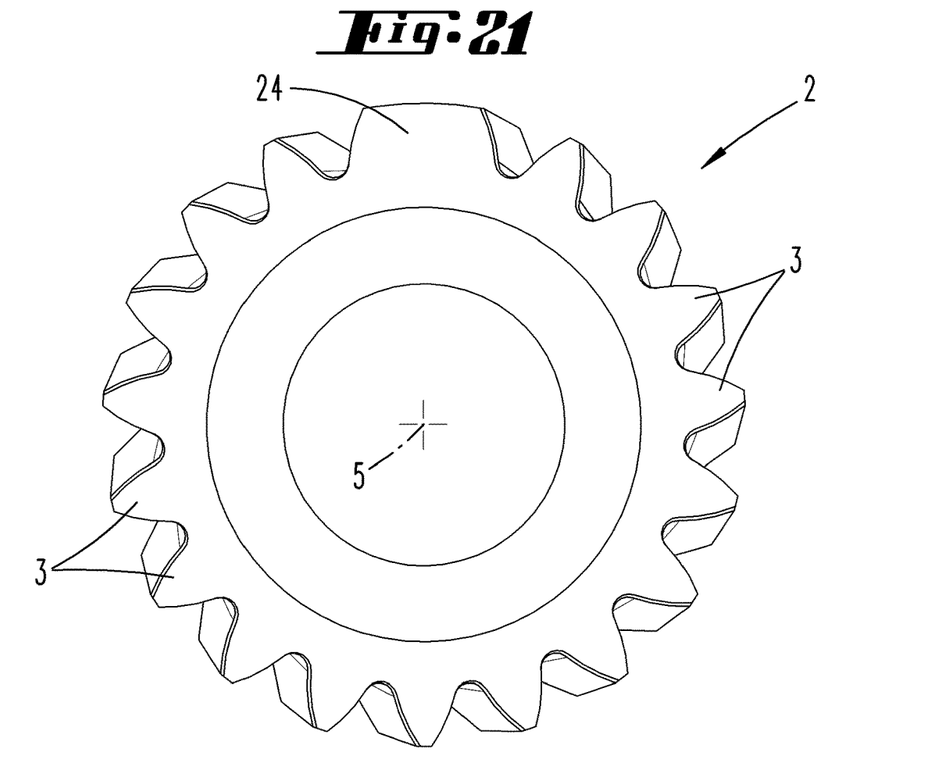
FIG. 21 shows a cutting wheel comprising a widened cutting tooth 24 as fifth exemplary embodiment of the invention.
Figure 22:
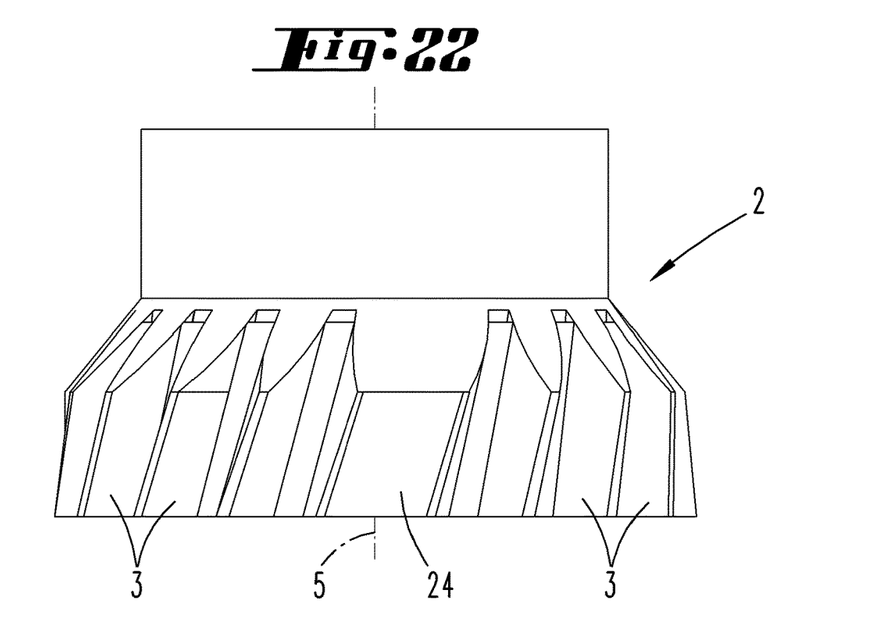
FIG. 22 shows the side view of the cutting wheel illustrated in FIG. 21.

The teeth 3, 24 of the cutting wheel 2 illustrated in FIGS. 21 and 22 also form cutting edges, which are formed by grooves 19 or chamfers 18, respectively, and which have tip cutting sections. In contrast to the cutting tools 2 described in the preceding exemplary embodiments, the cutting tool illustrated in FIGS. 20 and 21 has at least one cutting tooth 24, which is widened in circumferential direction of the cutting tool 2. The cutting tooth 24 extends across a circumferential length of two cutting teeth 3 of the regular division. The block cutting tooth 24 is thus formed by two regular cutting teeth 3, between which the tooth gap is missing.

The circumferential length of the block cutting tooth 24, however, is otherwise not limited. The tooth length in circumferential direction can also be an uneven division.

The front face 7 of the working gear 1 can be a plane. The front face 7, however, can also be an inner cone surface. The apex lines of the cutting teeth 3, 24 can be arranged on a cylinder jacket surface, so that the cutting wheel 2 can be used in an operating position according to FIG. 14 or 20. The apex lines of the cutting teeth 3, 24, however, can also run on a truncated cone jacket surface, as in the case of a tool according to FIGS. 1 to 12.

The above statements serve as an explanation of the inventions captured by the application as a whole, which further develop the prior art at least by means of the following feature combinations, in each case also independently, namely:

A method, which is characterized in that the cutting edge 12, which is assigned to a tooth flank 6, which runs at an acute angle to the front face 7 of the cutting tooth 3, 24, is formed by the edge of a chamfer 18, the cutting edge 8, which is assigned to a tooth flank 6', which runs at an obtuse angle to the front face 7 of the cutting tooth 3, is formed by the edge of a groove 19, and the front faces 7 of all cutting teeth 3, 24 are located in a surface, in particular a plane or an inner cone jacket surface, which runs around the tool spindle axis 5 in a rotationally symmetrical manner.

A method, which is characterized in that each of the two flank cutting sections 8, 12 is adjoined by a tip cutting section 9, 11, which extends along a second contour line in the area of the base of the cutting tooth gap 20, wherein the second contour line is curved with a foot corner curvature and that at least partially rounded tooth tips 16 of the teeth 13 are produced by means of the tip cutting sections 9, 11.

A method, which is characterized in that the rounded tip cutting sections 9, 10, 11 connect the two flank cutting sections 8, 12, except for a chip-breaking discontinuity, in a substantially kink-free manner to a U-shaped cutting edge.

A method, which is characterized in that the apex line 3' of the cutting teeth 3, 24, which runs in the direction of extension of the cutting teeth 3, 24, run in a cylinder jacket surface and that the tool spindle axis 5 is inclined by an angle of inclination β at right angles to the axis intersection angle α with respect to the workpiece spindle axis 4.

A method, which is characterized in that the cutting tool 2 has at least one cutting tooth 24, which is widened in circumferential direction of the cutting tool 2 with respect to the other cutting teeth 3 and the speed ratio is chosen in such a way that the widened cutting tooth 24 enters into the same widened tooth gap between two teeth of the working gear 1 again, after rotating around the cutting tool 2 once or several times and after rotating around the working gear 1 once.

A method, which is characterized in that the at least one widened cutting tooth 24 extends across at least one even or uneven or fractional number of sections of the regular division of the cutting tool 2 and/or across a complete tooth gap or has any length.

A cutting tool, which is characterized in that the cutting edge 12, which is assigned to a tooth flank 6, which runs at an acute angle to the front face 7 of the cutting tooth 3, is formed by the edge of a chamfer 18, the cutting edge 8, which is assigned to a tooth flank 6', which runs at an obtuse angle to the front face 7 of the cutting wheel 3, is formed by the edge of a groove 19, and the front faces 7 of all cutting teeth 3, 24 are located in a surface, in particular a plane or an inner cone jacket surface, which runs around the tool spindle axis 5 in a rotationally symmetrical manner.

A cutting tool, which is characterized in that each of the two flank cutting sections 8, 12 is adjoined by a tip cutting section 9, 11, which extends along a second contour line in the area of the base of the cutting tooth gap 20, wherein the second contour line is curved with a foot corner curvature.

A cutting tool, which is characterized in that the rounded tip cutting sections 9, 10, 11 connect the two flank cutting sections 8, 12 without a kink, except for a chip-breaking discontinuity, in a substantially kink-free manner to a U-shaped cutting edge.

A cutting tool, which is characterized in that the apex line 3' of the cutting teeth 3, 24, which runs in the direction of extension of the cutting teeth 3, 24, run in a cylinder jacket surface.

A cutting tool, which is characterized in that the cutting tool 2 has at least one cutting tooth 24, which is widened in circumferential direction of the cutting tool 2 with respect to the other cutting teeth 3.

A cutting tool, which is characterized in that the at least one widened cutting tooth 24 extends across at least one complete tooth gap extending across the regular division of the cutting tool.

A method or a device, which are characterized in that each of the two flank cutting sections 8, 12 is adjoined by a tip cutting section 9, 11, which extends along a second contour line in the area of the base of the cutting tooth gap 20, wherein the second contour line is curved with a foot corner curvature, and that at least partially rounded tooth tips 16 of the teeth 13 are produced by means of the tip cutting sections 9, 11.

A method or a device, which are characterized in that the cutting edge 12, which is assigned to a tooth flank 6, which runs at an acute angle to the front face 7 of the cutting tooth 3, is formed by the edge of a chamfer 18, the cutting edge 8, which is assigned to a tooth flank 6', which runs at an obtuse angle to the front face 7 of the cutting tooth 3, is formed by the edge of a groove 19, and the cutting edges 9 to 12, which define a cutting tooth gap 20 between two adjoining cutting teeth 3, are offset maximally by the depth of the groove 19 or the depth of the chamfer 18 or in particular maximally by the difference of the depth of the chamfer 18 from the depth of the groove 19 with respect to a common plane.

A use for providing teeth on working gears 1 by means of the hob peeling method.

A device, which is characterized by an electronic control device, which is programmed in such a way that a working gear 1 is produced by means of hob peeling.

All disclosed features (alone or also in combination with one another) are significant for the invention. The disclosure content of the corresponding/enclosed priority documents (copy of the prior application) is hereby also included in the disclosure of the application in its entirety, also for the purpose of adding features from these documents in the claims of the application at hand. The features of the subclaims characterize independent inventive further developments of the prior art, in particular in order to file divisional applications on the basis of these claims.

The invention claimed is:

1. A method for skiving, comprising:
providing teeth on a working gear using a cutting tool having cutting teeth with tip cutting sections to cut tips into the teeth of the working gear,
wherein the working gear is driven in rotation by a workpiece spindle about a workpiece spindle axis and the cutting tool is driven in rotation by a tool spindle about a tool spindle axis at a predetermined speed ratio to one another, the workpiece spindle axis and the tool spindle axis are oriented at an axis intersection angle to one another;
and wherein tooth flanks of the cutting teeth have, on first ends thereof, cutting edges having flank cutting sections, which are arranged on edges of cutting tooth gaps between two adjacent cutting teeth and in each case extend along first contour lines of each cutting tooth, and which, as a result of an advance in the direction of the rotation of the working gear, engage in the working gear in a cutting manner to produce the teeth, the teeth having a tooth flank contour predetermined by the shape of the cutting edges along the first contour lines of each cutting tooth;
wherein each cutting tooth of the cutting teeth has an acute tooth flank of the tooth flanks, each acute tooth flank running at an acute angle to a front face of the associated cutting tooth;
wherein each acute tooth flank has on the first end thereof a first flank cutting section of the flank cutting sections, each first flank cutting section being formed by an edge of a respective chamfer;
wherein each cutting tooth of the cutting teeth further has an obtuse tooth flank of the tooth flanks, each obtuse tooth flank running at an obtuse angle to the front face of the associated cutting tooth;
wherein each obtuse tooth flank has on the first end thereof a second flank cutting section of the flank cutting sections, each second flank cutting section being formed by an edge of a respective groove, and
the front faces of all of the cutting teeth are located in a plane of a front face of the cutting tool, the front face of the cutting tool running around the tool spindle axis in a rotationally symmetrical manner;
wherein for each cutting tooth of the cutting teeth, the first flank cutting section and the second flank cutting section thereof form a pair of flank cutting sections, and each pair of flank cutting sections is adjoined to a next pair of flank cutting sections by one of the tip cutting sections, which extend along a second contour line in an area of a base of one of the cutting tooth gaps;
wherein the second contour line is curved with a corner curvature, and at least partially rounded tooth tips of the teeth of the working gear are produced by the tip cutting sections, and
the pair of flank cutting sections of each cutting tooth are offset by a distance from the plane of the front face of the cutting tool, whereas the tip cutting sections of each cutting tooth gap run in the plane of the front face of the cutting tool.

2. The method according to claim 1,
wherein the one of the tip cutting sections connects the one pair of flank cutting sections to the next pair of flank cutting sections without a kink, except for a chip-breaking discontinuity, thereby creating a smooth transition from one of the first and second flank cutting sections of the one pair of flank cutting sections to a U-shaped cutting edge;

wherein the chip-breaking discontinuity breaks chips produced by cutting the tips of the teeth of the working gear.

3. The method according to claim 1, wherein each of the tip cutting sections has a respective apex cutting section, which runs in the plane of the front face of the cutting tool, and the tool spindle axis is inclined by an angle of inclination at right angles to the axis intersection angle with respect to the workpiece spindle axis.

4. The method according to claim 1, wherein the one of the tip cutting sections comprises a first tip cutting section that follows the first flank cutting section of the one pair of flank cutting sections and further comprises a second tip cutting section that follows the second tip cutting section of the next pair of flank cutting sections.

5. The method according to claim 4, wherein the first and second tip cutting sections of the one of the tip cutting sections runs in an arc that is oriented away from each of a first flank cutting section arc on which the followed first flank cutting section runs and a second flank cutting section arc on which the followed second flank cutting section runs.

* * * * *